US009372872B2

(12) United States Patent
Murata

(10) Patent No.: US 9,372,872 B2
(45) Date of Patent: Jun. 21, 2016

(54) DISPLAY CONTROL APPARATUS, DISPLAY CONTROL METHOD, AND STORAGE MEDIUM FOR DISPLAYING A CONTENT OF A FILE ON A DISPLAY APPARATUS

(75) Inventor: Takemasa Murata, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 356 days.

(21) Appl. No.: 13/606,376

(22) Filed: Sep. 7, 2012

(65) Prior Publication Data
US 2013/0076705 A1 Mar. 28, 2013

(30) Foreign Application Priority Data

Sep. 22, 2011 (JP) ................................. 2011-207267

(51) Int. Cl.
G06F 3/0482 (2013.01)
G06F 17/30 (2006.01)
(52) U.S. Cl.
CPC .............. G06F 17/30274 (2013.01)
(58) Field of Classification Search
CPC ..... G06G 3/0482; G06F 9/4443; G06F 3/048; G06F 3/04842; G06F 3/0486; G06F 17/30849; G06F 3/0482; G06F 17/30843
USPC ........................................................ 715/829
See application file for complete search history.

(56) References Cited

U.S. PATENT DOCUMENTS

| 8,789,103 | B2* | 7/2014 | Onogi et al. ..................... 725/43 |
| 2002/0019813 | A1* | 2/2002 | Furuya ............................. 705/52 |
| 2006/0155401 | A1* | 7/2006 | Matsuzaki et al. .............. 700/94 |
| 2007/0174790 | A1* | 7/2007 | Jing et al. ....................... 715/838 |
| 2009/0164944 | A1* | 6/2009 | Webster et al. ............... 715/838 |

FOREIGN PATENT DOCUMENTS

| JP | 2006320650 A | 11/2006 |
| JP | 2008-71168 A | 3/2008 |

* cited by examiner

Primary Examiner — Jennifer To
Assistant Examiner — Terri Filosi
(74) Attorney, Agent, or Firm — Canon USA, Inc., IP Division

(57) ABSTRACT

According to an aspect of the present invention, a display control apparatus is capable of displaying on a display apparatus a content of a plurality of files classified into a plurality of groups. If a number of files from a first file, which is a display target to the display apparatus, to a second file, which is included in a group newly determined as a display target, in the predetermined order is equal to or greater than a predetermined number, the display control unit causes the display apparatus to display a content of at least one file between the first file and the second file in the predetermined order before a display target file is changed from the first file to the second file and a content of the second file is displayed. Accordingly, display of many files can be prevented from being skipped.

15 Claims, 9 Drawing Sheets

| 0001.jpg | 0002.jpg | 0003.jpg | 0004.jpg | 0005.jpg | 0006.jpg | 0007.jpg | 0008.jpg |
|---|---|---|---|---|---|---|---|
| SHOOTING DATE: 2009/1/1 SHOOTING TIME: 8:00 | SHOOTING DATE: 2009/1/1 SHOOTING TIME: 9:00 | SHOOTING DATE: 2009/1/1 SHOOTING TIME: 10:00 | SHOOTING DATE: 2009/1/1 SHOOTING TIME: 12:00 | SHOOTING DATE: 2009/1/2 SHOOTING TIME: 8:00 | SHOOTING DATE: 2009/1/2 SHOOTING TIME: 12:00 | SHOOTING DATE: 2009/1/5 SHOOTING TIME: 15:00 | SHOOTING DATE: 2009/1/10 SHOOTING TIME: 12:00 |
| 401 | 402 | 403 | 404 | 405 | 406 | 407 | 408 |

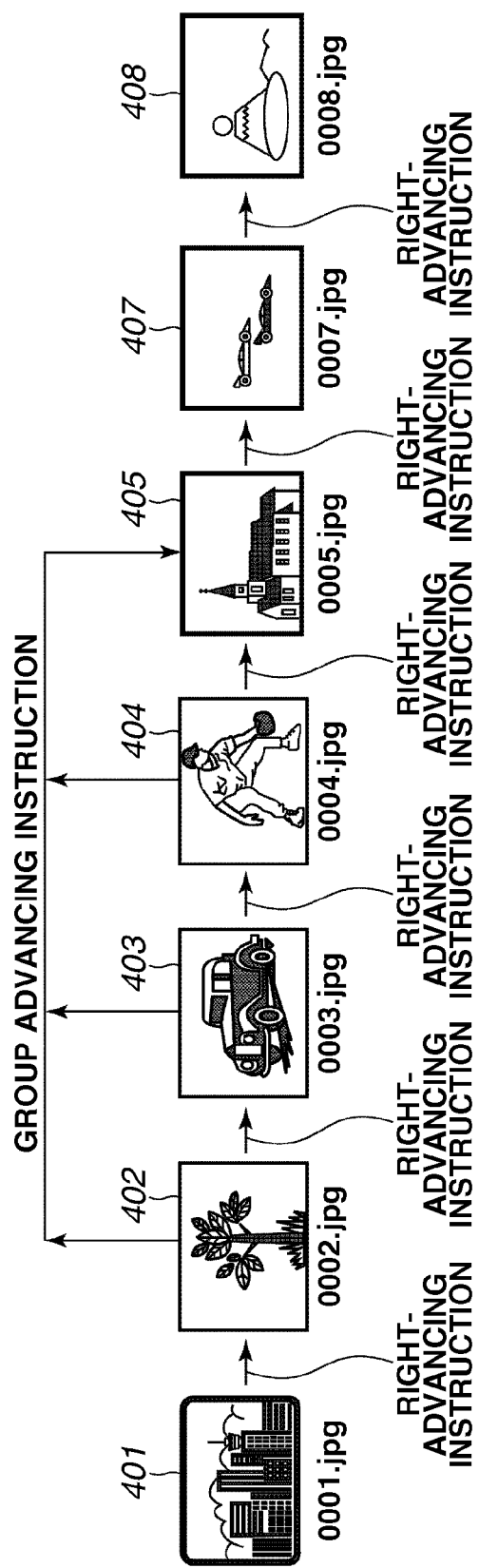

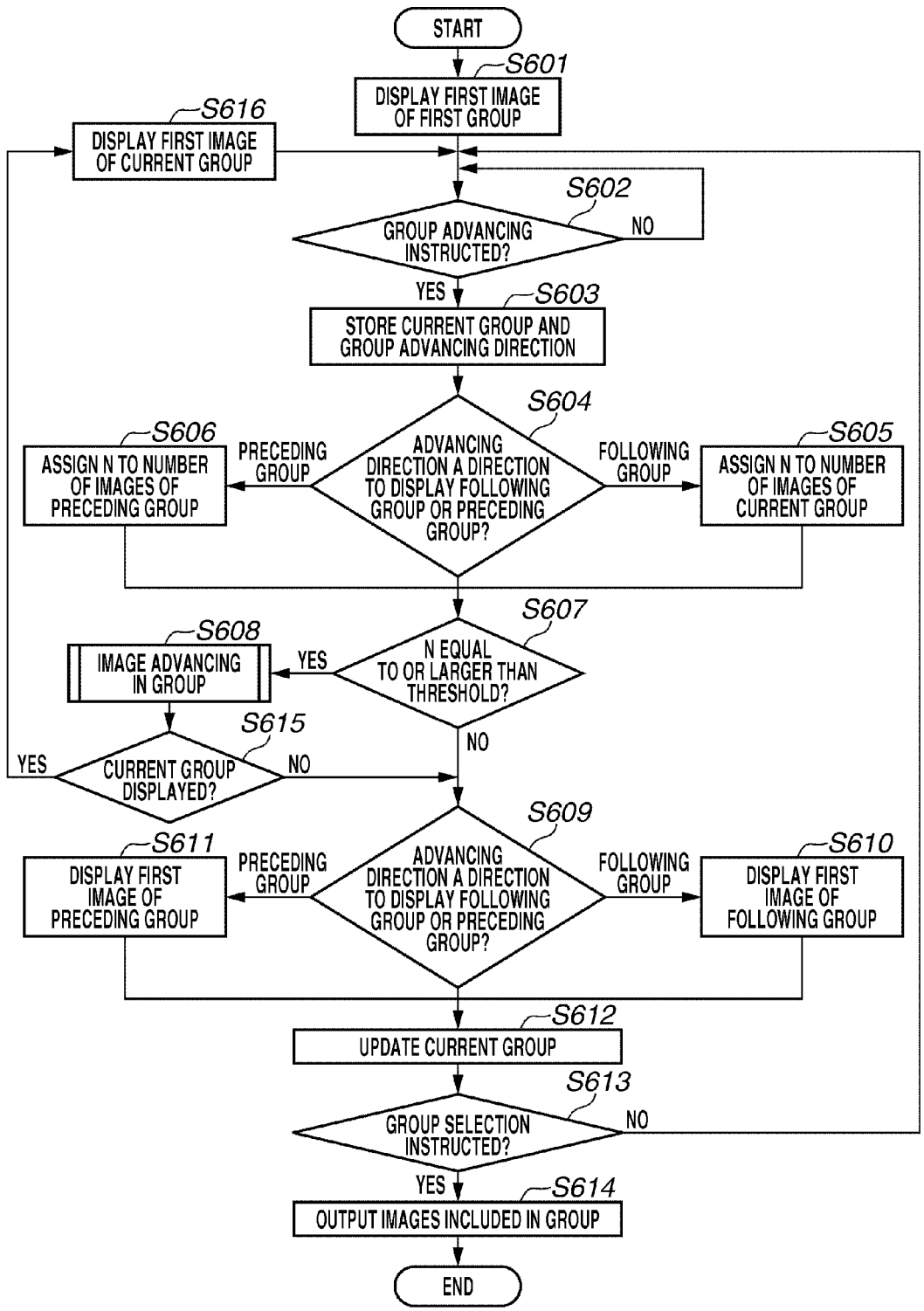

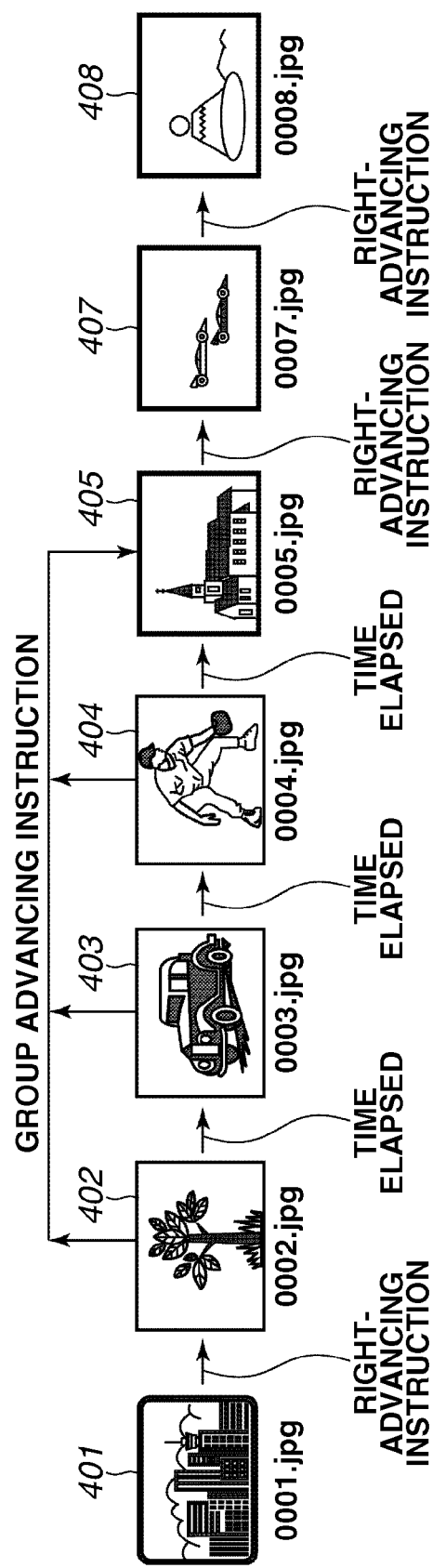

DISPLAY CONTROL APPARATUS, DISPLAY CONTROL METHOD, AND STORAGE MEDIUM FOR DISPLAYING A CONTENT OF A FILE ON A DISPLAY APPARATUS

BACKGROUND OF THE INVENTION

1. Field of the Invention

The present invention relates to a display control apparatus, a display control method, and a storage medium for displaying contents of a file on a display apparatus.

2. Description of the Related Art

Recently, a technique for storing images captured by a digital camera in a storage medium, such as a memory card, as an image file has become widely used. The images recorded on the storage medium are output to various types of devices, such as a digital camera, a personal computer (PC), and a printer, for browsing, editing, and printing. In addition to the widespread use of a digital camera, a capacity of a storage medium, in which images captured by a digital camera are stored, has increased. This leads to a need for a method for enabling a user to quickly search for a desired image.

Japanese Patent Application Laid-Open No. 2008-71168 discusses a method for classifying a plurality of image files stored in a storage medium into a plurality of groups and advancing images on a group basis. According to this method, a representative image of a group is displayed on a display screen and, in response to a user's instruction, a representative image of the group immediately preceding or following the group is displayed. The user can confirm the contents of the representative image displayed on the display screen to specify a desired group.

However, according to the above-described conventional technique, when a user's instruction is input, one file included in the group immediately preceding or following the currently displayed group is displayed regardless of how many files are included in one group. In other words, if one group includes many files, the display of many files is skipped and then the display file is switched from the current file to the next. In this case, the user is not aware that the display of many files is skipped, and there is a possibility that the user cannot find the group in which a desired file is included.

SUMMARY OF THE INVENTION

The present invention is directed to a technique capable of preventing display of many files from being skipped when files in a group newly determined as a display target is displayed by a user's instruction.

According to an aspect of the present invention, a display control apparatus capable of displaying on a display apparatus contents of a plurality of files classified into a plurality of groups includes a display control unit configured to cause the display apparatus to display a content of a file included in any one of the plurality of groups by changing a display target file among a plurality of files included in the plurality of groups according to a predetermined order of the plurality of files, and a determination unit configured to determine a group to be a display target displayed by the display control unit from the plurality of groups according to a user instruction, wherein, if a number of files from a first file, which is a display target to the display apparatus, to a second file, which is included in a group newly determined as a display target by the determination unit, in the predetermined order is equal to or greater than a predetermined number, the display control unit causes the display apparatus to display a content of at least one file between the first file and the second file in the predetermined order before a display target file is changed from the first file to the second file and a content of the second file is displayed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of display when images are displayed under display control according to an exemplary embodiment of the present invention.

FIG. 6 is a flowchart illustrating image advancing processing on a group basis according to the exemplary embodiment.

FIG. 8 illustrates an example of display when images are displayed in the exemplary embodiment.

DESCRIPTION OF THE EMBODIMENTS

Various exemplary embodiments, features, and aspects of the invention will be described in detail below with reference to the drawings.

Figure 1:
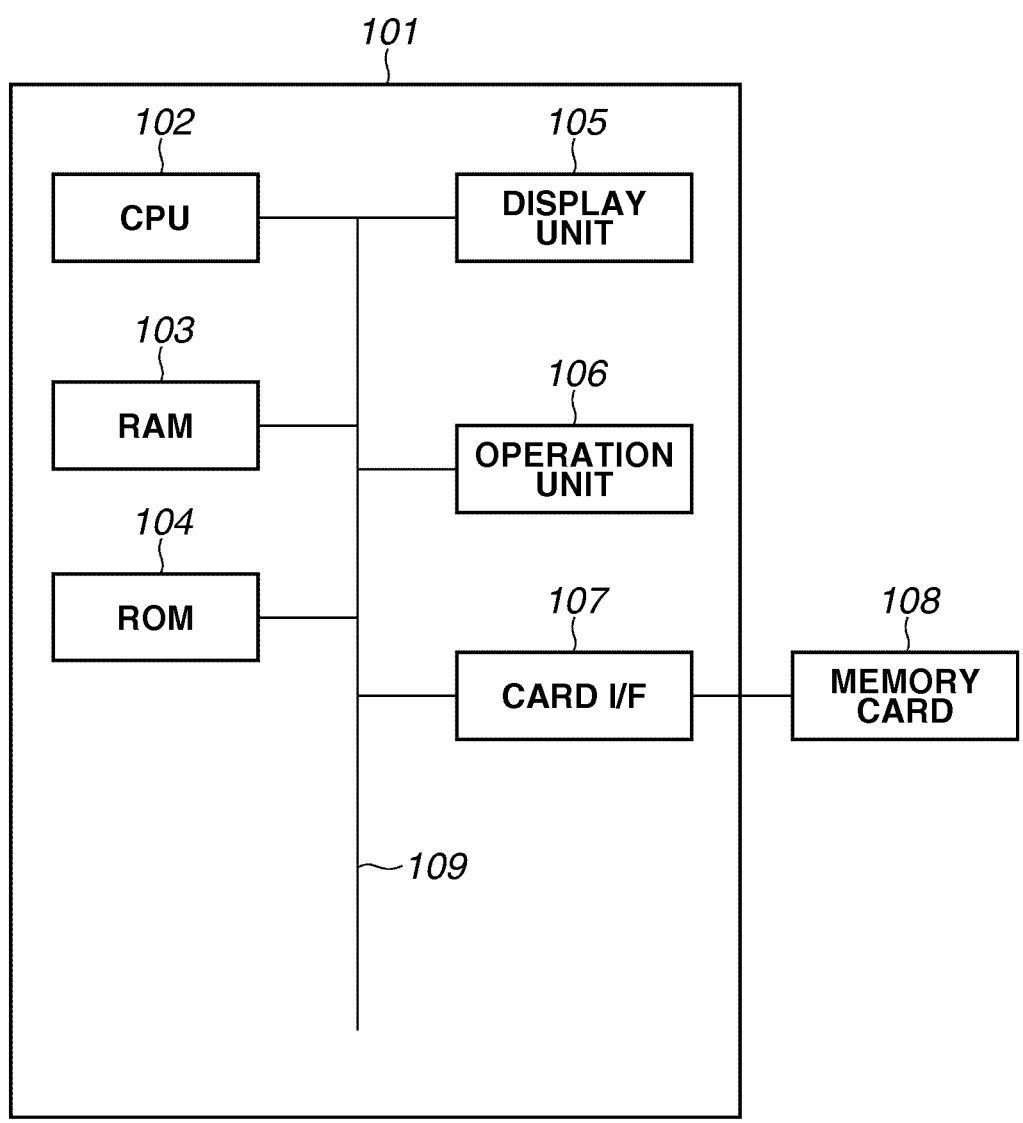
FIG. 1 illustrates a configuration of a display control apparatus.

FIG. 1 illustrates a configuration of a display control apparatus 101. The display control apparatus 101 includes a central processing unit (CPU) 102, a random access memory (RAM) 103, a read only memory (ROM) 104, a display unit 105, an operation unit 106, and a card interface 107 as components. These components are interconnected via a bus wiring line 109.

The CPU 102 controls the entire display control apparatus 101. The RAM 103 is a volatile semiconductor memory and stores program control variables. The RAM 103 also provides various work buffer areas in which data is temporarily stored. The ROM 104 is a nonvolatile semiconductor memory and stores control programs and an operating system (OS) program executed by the CPU 102. The CPU 102 reads various programs from the ROM 104 into the RAM 103 for execution. Thus, the CPU 102 can perform various types of processing for controlling the display control apparatus 101.

The display unit 105 is a display output apparatus such as a liquid crystal display and displays various types of information on a screen according to an instruction received from the CPU 102. The operation unit 106 includes various types of keys and receives a user's instruction. The card interface 107 accesses a memory card 108 mounted in the display control apparatus 101 to read data from the memory card 108 or to write data to, or erase data from the memory card 108.

According to the configuration described above, the CPU 102 can access a file stored in the memory card 108 via the card interface 107 in response to a user's instruction input by the operation unit 106, and display the contents of the file on the display unit 105.

Figure 2:
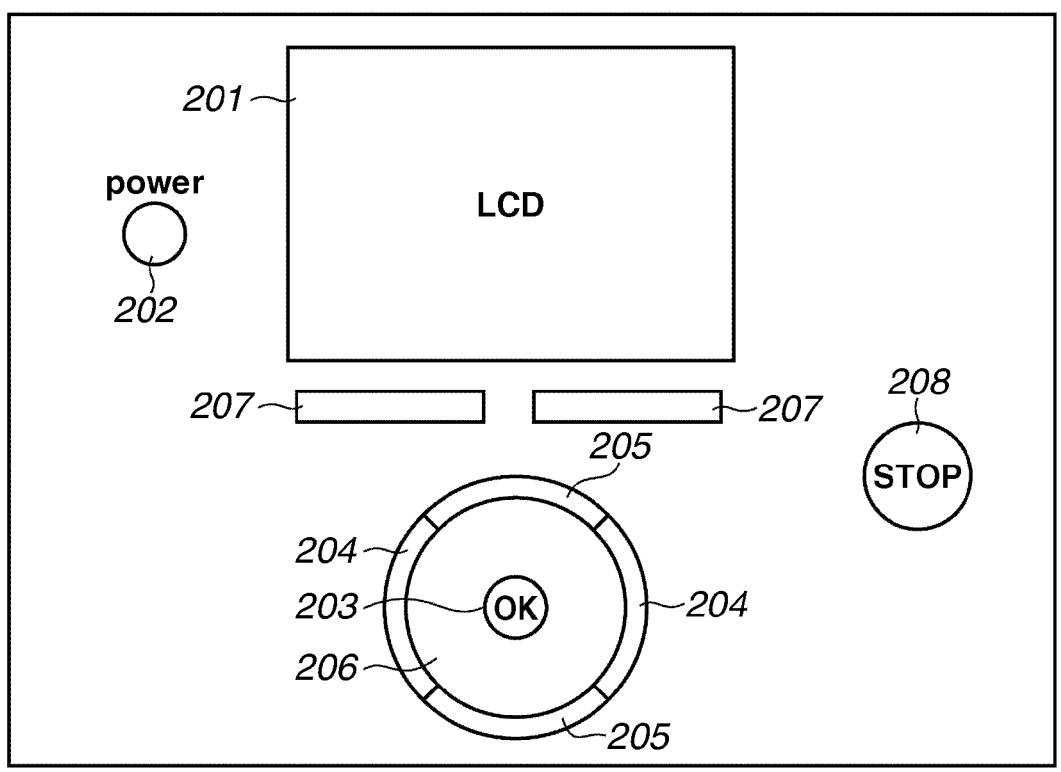
FIG. 2 illustrates a configuration of a display unit and an operation unit.

FIG. 2 illustrates the configuration of the display unit 105 and the operation unit 106. The display unit 105 includes a liquid crystal screen 201. The operation unit 106 includes a POWER key 202, an OK key 203, left/right keys 204, up/down keys 205, a rotary key 206, function keys 207, and a STOP key 208.

On the liquid crystal screen 201, the contents of a file stored in the memory card 108, status information about the display control apparatus 101, or the like is displayed. The POWER key 202 turns on or off the power of the display control apparatus 101. The OK key 203 allows the user to select one selection candidate from various selection candidates displayed on the liquid crystal screen 201. For example, when the user presses the OK key 203 in a state in which an image of an image file is displayed on the liquid crystal screen 201, the displayed image is determined as the image selected by the user.

The left/right keys 204, the up/down keys 205, and the rotary key 206 allow the user to change an image displayed on the liquid crystal screen 201 or to select a menu item. The function keys 207 are used for executing the function corresponding to an image displayed on the liquid crystal screen 201. The STOP key 208 stops the operation currently executed by the display control apparatus 101.

The user can change the image displayed on the liquid crystal screen 201 by pressing the left/right keys 204. The image is one of those stored in the memory card 108. For example, when the right key 204 is pressed, the display target image can be changed according to a predetermined order in which the images are stored in the memory card. When the left key is pressed, the display target image can be changed in the order reverse to the predetermined order described above. In this manner, the user can use the left/right keys 204 to perform image advancing for displaying a desired image on the display unit 105.

With a desired image displayed on the display unit 105, the user can press the OK key 203 to select the image displayed on the display unit 105 as an output target image. In response to the selection, the CPU 102 reads the output target image stored in the memory card 108 via the card interface 107 and outputs the image. As an output method, for example, the user can output the selected image on a printing apparatus (not illustrated) to print the image. Further the output method may include a case in which the user stores the selected image in an internal or external memory of the display control apparatus 101, and a case in which the user transmits the selected image to an external device via the network.

When the user advances images as described above, the user can not only change the display images one at a time according to the predetermined order but also advance images in various ways. For example, by pressing the left/right keys 204, the user can display every predetermined number of images so that a predetermined number of images are skipped. In addition, the user can classify the images stored in a memory card into a plurality of groups and change the display images for each classified group. When images are displayed on a group basis, one representative image is displayed as the representative of the group.

Figure 7A:
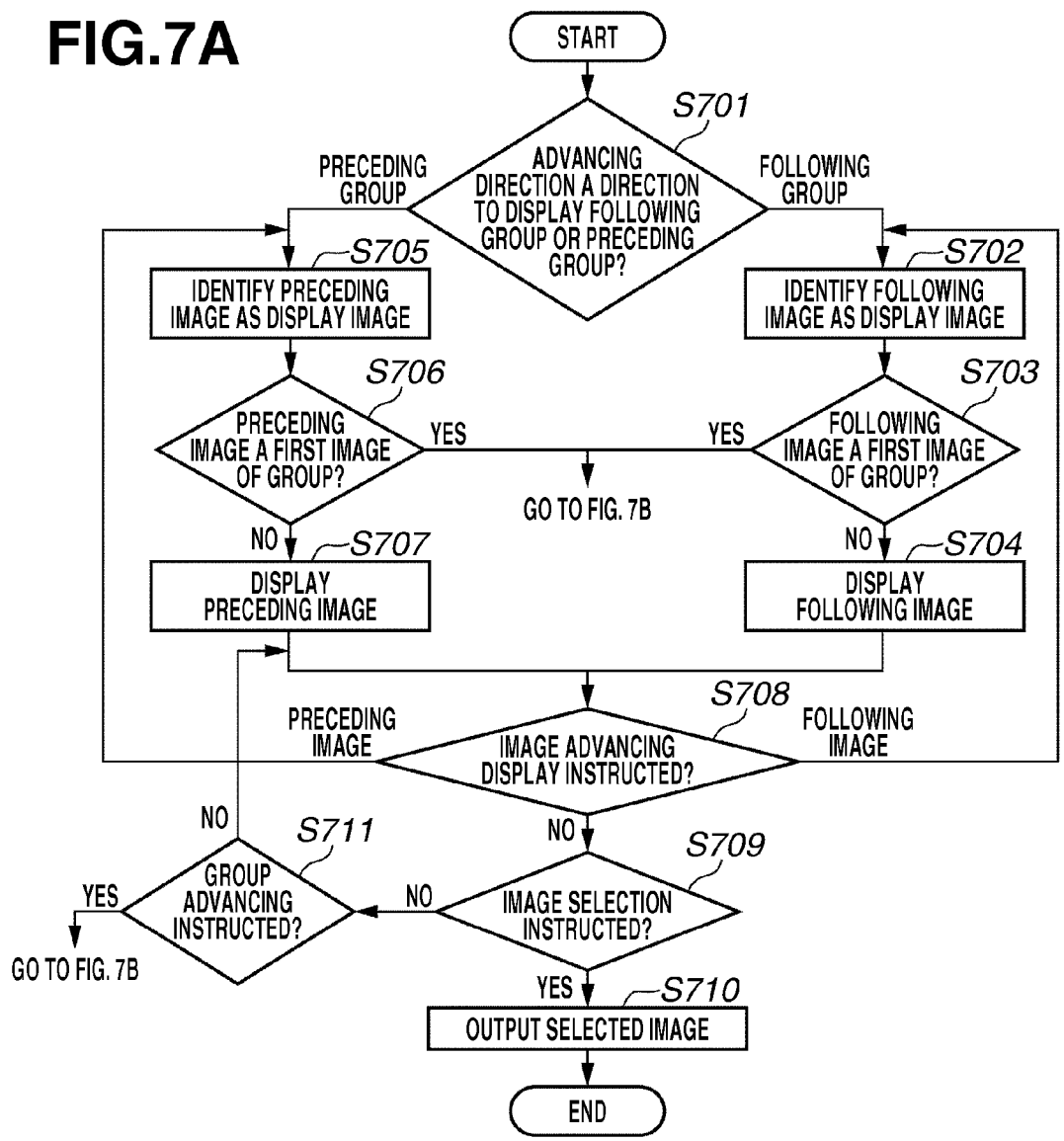
FIGS. 7A and 7B are flowcharts illustrating the processing in step S608 in FIG. 6.

In the present exemplary embodiment, a method for changing display target images on a group basis is particularly described. According to the present exemplary embodiment, if the number of images included in one group is equal to or greater than a threshold, the images other than the representative image in the group are displayed without being skipped. Accordingly, the user can select an image other than the representative image in the group if one group includes many images in a case in which the method for changing the display target images on a group basis is selected. The processing according to the present exemplary embodiment is described below with reference to FIG. 5 to FIG. 7.

Figure 3:
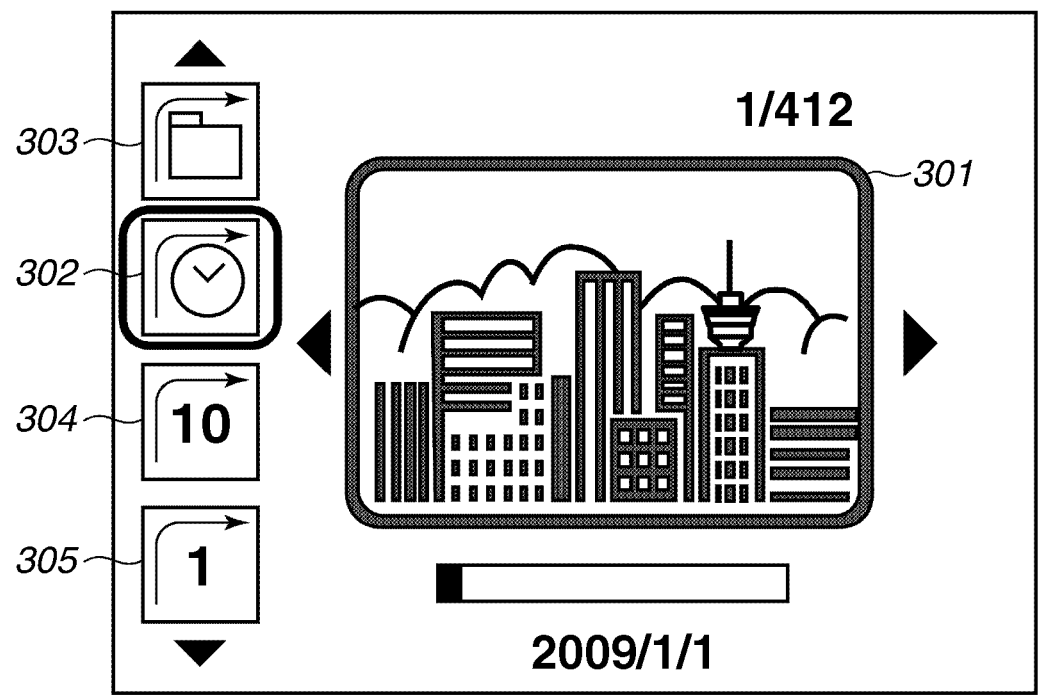
FIG. 3 illustrates an example of display on a liquid crystal screen when a user selects a desired image.

Next, the screen display and the operation method when the user selects a desired image are described. FIG. 3 illustrates an example of display on the liquid crystal screen 201 when the user selects a desired image. On the display screen illustrated in FIG. 3, an image to be displayed in an image display area 301 is changed when the user presses the left/right key 204.

Icons 302 to 305 in FIG. 3 indicate conditions for determining a display target image when the user presses the left/right key 204. The user can press the up/down key 205 to select one of the icons 302 to 305 for selecting the condition described above.

When the icon 302 is selected, a method is selected that classifies a plurality of images into groups according to an image attribute and displays the representative image for each group. In the example illustrated in FIG. 3, the icon 302 indicates the shooting date of an image. When the user selects the icon 302, the CPU 102 classifies the images stored in the memory card 108 according to the shooting dates. In this case, each time the user presses the left/right key 204, the display target image is changed, and the representative image among the images shot on each shooting date is serially displayed. According to the present exemplary embodiment, the earliest-shot image (leading image) of the images shot on each shooting date is selected as the representative image.

When the icon 303 illustrated in FIG. 3 is selected, the images are classified into groups each corresponding to a folder that stores the images in the memory card 108. In this case, each time the user presses the left/right key 204, the display target image is changed on a folder basis and the representative image stored in each folder is sequentially displayed.

When the user selects the icon 304 or 305, the processing is selected in which the display target image is changed for each predetermined number of images. For example, when the icon 304 is selected, the processing for changing the display target image for each ten images is selected, so that nine images are skipped and the tenth image is displayed, in response to a user's instruction. On the other hand, when the icon 305 is selected, the processing for changing the display target image one at a time is selected.

When the user selects the icon 302 or the icon 303 as described above, the processing is selected in which the image files are classified into groups and image advancing is performed on a classified group basis. However, according to the present exemplary embodiment, when the icon 302 or 303 is selected but when many images are included in one group, a plurality of images in the group is displayed. The detail of the processing is described below.

When the icon 302 is selected and a plurality of images is classified into groups according to the shooting dates, the CPU 102 classifies the images according to time information indicating the image shooting time. The CPU 102 can obtain the above-described time information from image files. For example, when an image file conforms to Exchangeable Image File Format (Exif), a header of the image file includes the time information indicating the image shooting date and time. The CPU 102 can obtain the time information included in the header of an image file in the memory card 108 and, based on the time information, classify the images by shooting date.

The time information corresponding to an image file is not limited to the shooting time, and the creation date and time or the update date and time of the image file may also be used. Because the time information is included in the header of an image file, the CPU 102 can classify the images according to the creation date or update date of the image files.

Images can be classified into groups not only by the time information about the images but also by various types of attributes, such as a size of an image file, an identifier of a file, and a shooting location of an image.

On the other hand, when the icon 303 is selected to classify a plurality of image files into groups each corresponding to a folder, the image files are classified according to file path information provided for accessing the image files stored in the memory card 108.

When a plurality of image files stored in the memory card 108 are classified into groups according to folders or shooting dates as described above, a file list may be used to classify the image files.

The CPU 102 creates the file list, which indicates the order of image files according to the characteristics of the image files, in the RAM 103 when the memory card 108 is mounted on the display control apparatus 101.

For example, the CPU 102 determines the order of the plurality of image files according to the creation date and time of the plurality of image files or the shooting date and time of the images, and then creates the file list that indicates the determined order. When the user selects the icon 302 and a plurality of image files is classified according to dates, the CPU 102 can classify the image files for each date according to dates (creation dates, shooting dates) corresponding to the image files described in the file list.

The file list also includes file path information used to access the image files stored in the memory card 108. Therefore, when the icon 303 is selected, the CPU 102 identifies a folder, in which image files are stored, according to the file path information included in the file list. Accordingly, a plurality of image files can be classified according to the folders in which the plurality of image files is stored in the memory card 108.

When the order of image files is determined according to the file path information, the order is determined first by the folder names and then by the file names of the image files. In other words, in the file list, the order of image files is determined first according to the folder names and, in each folder, the order of image files is determined according to the file names of the image files. Therefore, the leading image in each folder is also determined by the file name of the image file. The order of the image files in each folder may be determined not only by file names but also by various attributes such as file sizes.

As described above, a plurality of image files may be classified into groups according to the file list indicating the order of the files stored in the memory card 108. When a display target group is changed according to the present exemplary embodiment, the leading image of each group is displayed according to the order of the image files indicated by the file list. More specifically, the display target group and the display target file can be determined according to the file list. The detail is described with reference to FIGS. 4A and 4B.

The display target group and file are determined not only by the file list created by the CPU 102. For example, if information indicating the file order and groups is stored in the memory card 108, the information may also be used.

Next, the display screen is specifically described on which the images are displayed on a classified group when the images stored on the memory card 108 are classified into groups. Before describing a display method according to the present exemplary embodiment, the following describes a display method for changing a display target image on a group basis with reference to FIGS. 4A and 4B.

Figures 4A, 4B:
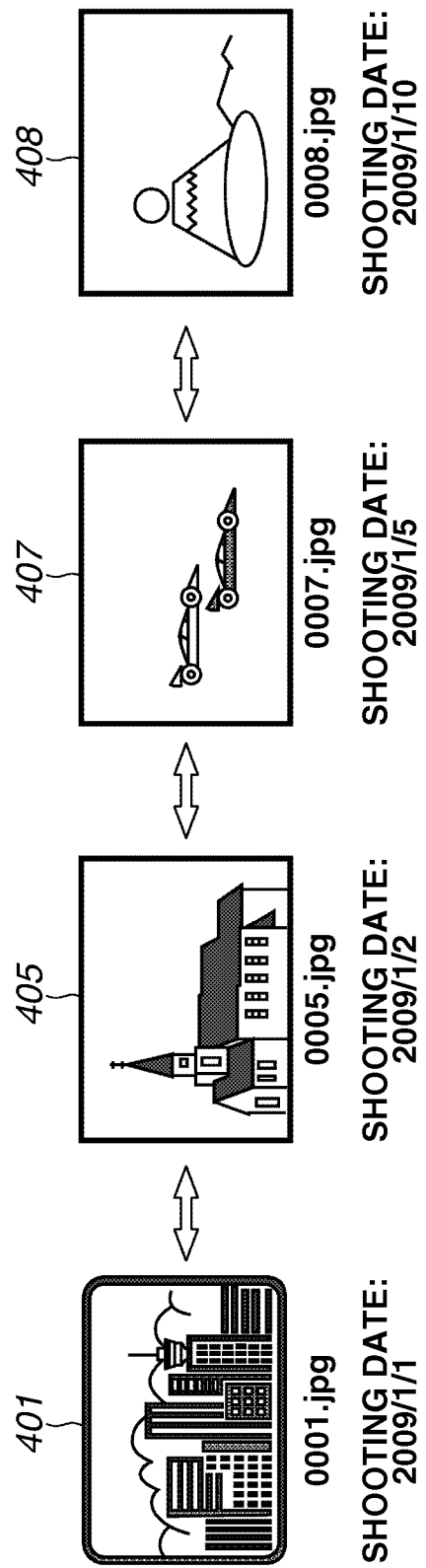
FIGS. 4A and 4B illustrate an example of display when images are advanced on a group basis.

FIG. 4A and FIG. 4B illustrate an example of display in which images are advanced on a group basis. In this example, image files 401 to 408 illustrated in FIG. 4A are stored in the memory card 108. The order of image files illustrated in FIG. 4A corresponds to the file list created by the CPU 102. The image files 401 to 408 are classified according to the shooting dates of the images in the order indicated by the file list. More specifically, the image files 401 to 408 are classified into four groups, that is a group A (image files 401 to 404), a group B (image files 405 and 406), a group C (image file 407), and a group D (image file 408).

In this case, each of the four leading images (the image files 401, 405, 407, and 408) of each shooting date is a display target at image advancing as the representative image of each group. When the user presses the left/right key 204 to change the display target group, the group is changed and the leading image of each group is displayed as illustrated in FIG. 4B. When the user presses the left key while the image file 401 is displayed, the image in the image file 408 is displayed. When the user presses the right key 204 while the image file 408 is displayed, the image file 401 is displayed. In this manner, the user can press the left/right key 204 to change the group and display the leading image of each group.

However, when the display target image is changed on a group basis as illustrated in FIG. 4B, images are advanced on a group basis regardless of the number of images included in a group. In addition, when the images stored in the memory card 108 are classified into a plurality of groups, the number of images included in each group vary according to the image attribute or the conditions used for classifying the images. Therefore, when the images are classified into a plurality of groups, the user cannot identify the number of images included in each group.

In other words, when a predetermined number of images are skipped, the user can identify the number of skipped images when the display target is changed. However, when the display target is changed on a group basis as illustrated in the display example in FIG. 4B, the user cannot identify the number of skipped images when the display target is changed. Therefore, the display of many images is unintentionally omitted, sometimes resulting in a case where the user cannot recognize that a desired image has been skipped.

For example, when the user presses the right key 204 in order to advance the images in the right direction in the state in which the image file 401 is displayed, in the display example illustrated in FIG. 4B, the image in the image file 405, an image belonging to the next group, is displayed regardless of the number of images in the group. In this case, there is no way for the user to know that the three images, image files 402 to 404, have been skipped. Therefore, even when a group includes many images, the user advances the images of the group without recognizing that the group includes many images.

According to the present exemplary embodiment, even if the user selects image advancing on a group basis, display of all images other than the representative image is not omitted but displayed if the number of images to be skipped from the display by group changing is equal to or greater than the threshold. In other words, images, which are originally skipped during image advancing on a group basis, are displayed as display targets.

Especially, when a display target group is changed, the leading image of the group is displayed according to the present exemplary embodiment. Thus, the number of images stored in one group is the number of images whose display is originally skipped by group changing. Therefore, in the description below, the number of images included in a group is compared with the threshold.

FIG. 5 illustrates an example of display when images are displayed by display control according to the present exemplary embodiment. In this example, the threshold is set to 4. When the number of images included in a group is less than 4, only the leading image in the group is displayed, and when the number of images included in a group is 4 or greater, the leading image as well as the other images in the group are displayed.

In FIG. 5, when a right-direction image advancing instruction is issued in the state in which the image file 401 is displayed, the images in the group including the image file 401 will be a display target, since there are four images which correspond to the shooting date of the image file 401. Therefore, images in the image file 402 are displayed as the display target. When a right-direction image advancing instruction is issued in the state in which the image file 402 is displayed in FIG. 5, the images in the image file 403 and the image file 404 are also displayed as the display target. Then, if another right-direction image advancing instruction is further issued, the image in the image file 405, the leading image of the next group, is displayed.

On the other hand, when a right-direction image advancing instruction is issued in the state in which the image in the image file 405 is displayed, the display of the image file 406 is omitted and the image file 407 is displayed. This is because there are two images which correspond to the shooting date of the image file 405.

As described above, even when the processing for changing the display target image on a group basis is selected and when a group includes many images, the images in the group are not skipped but displayed. Thus, the user can confirm the images other than the representative image included in a group that includes many images.

While the images in the image files 402 to 404 are displayed in one group as described above, the user sometimes wants to change the display target to the image in the image file 405. To satisfy this need, according to the present exemplary embodiment, while images other than the representative image in a group are displayed, a group advancing instruction for displaying the leading image of the following group or the preceding group is accepted. Thus, images in the current group are skipped, and a display target image is changed. In addition, to issue the group advancing instruction described above, the user is required to perform a predetermined operation. As for the predetermined operation, for example, the group advancing instruction is input when the right key 204 is pressed longer than a predetermined time.

Next, a processing procedure for image advancing on a group basis according to the present exemplary embodiment is described. FIG. 6 is a flowchart illustrating the image advancing processing on a group basis according to the present exemplary embodiment. The processing illustrated in the flowchart in FIG. 6 is implemented by the CPU 102, which reads the program corresponding to the processing in flowchart in FIG. 6 from the ROM 104 into the RAM 103 for execution.

The processing illustrated in the flowchart in FIG. 6 is started when the user selects the icon 302 or the icon 303 illustrated in FIG. 3, to issue an instruction to perform image advancing on a group basis. Before the processing is started, it is assumed that the images stored in the memory card 108 have already been classified into a plurality of groups. It is also assumed that the leading image of the group is displayed as the representative image of the group.

First, in step S601, the CPU 102 displays the leading image of the first group on the display unit 105. Next, instep S602, the CPU 102 checks whether the user enters an instruction to perform image advancing on a group basis. The instruction is input when the user presses the left/right key 204 while the icon 302 or the icon 303 is selected.

In step S602, if the instruction to perform image advancing on a group basis is input (YES in step S602), the processing proceeds to step S603. In step S603, the CPU 102 stores the group currently selected by the user and the group advancing direction specified by the user in the RAM 103. Processing for calculating the number of images in steps S605 and S606 and processing for displaying the leading image in steps S610 and S611 are performed by identifying the currently selected group based on the information stored in the RAM 103. The processing in these steps are described below.

The information indicating a group may be the file number of the leading image of the group in the file list or the information indicating all files included in the group. In addition, as the information indicating the group advancing direction, the CPU 102 stores a flag indicating whether the group advancing direction is the following group. It is determined that the flag value of 1 indicates the following group, and the flag value of 0 indicates the preceding group.

In step S604, the CPU 102 determines whether the user-specified group advancing direction is the direction to display the following group or the direction to display the preceding group.

In step S604, if the user-specified image advancing direction is the following group, the processing proceeds to step S605. In step S605, the CPU 102 acquires the number of images included in the group currently selected by the user. More specifically, the CPU 102 calculates the number of images from the leading image currently displayed on the display unit 105 to the leading image of the following group in the file list and assigns the calculated value to an image advancing number N.

The image advancing number N indicates the number of images that are skipped from display when images are advanced on a group basis. When images are advanced on a group basis, the display of (N−1) images is omitted. The image advancing number N is stored in the RAM 103.

On the other hand, in step S604, if the user-specified image advancing direction is the direction to display the preceding group, the processing proceeds to step S606. In step S606, the CPU 102 identifies the number of images included in the group preceding the group currently selected by the user. To identify the number of images, the CPU 102 calculates the number of images from the image currently displayed on the display unit 105 to the leading image of the preceding group in the file list and assigns the calculated value to the image advancing number N as in step S605.

In steps S605 and S606, the CPU 102 stores the flag corresponding to the group in the RAM 103 according to whether the user-selected group is the following group or the preceding group.

Next, in step S607, the CPU 102 determines whether the image advancing number N calculated in step S605 or S606, is equal to or greater than the threshold. Based on the determination result, the CPU 102 can determine whether the number of images (N−1) to be skipped from display is equal to or greater than the threshold when the display target group is changed to the following group or the preceding group.

Further, the CPU 102 determines the image to be displayed next according to the determination result.

Although the image advancing number N is compared with the threshold in the description illustrated in FIG. 6, it is also possible to compare the threshold with the number of images (N−1) to be skipped from display when the display group is changed.

In step S607, if it is determined that the image advancing number N is equal to or greater than the threshold (YES in step S607), the processing proceeds to step S608. The processing in step S608 is described below with reference to FIG. 7. Similarly, the processing in steps S615 and S616 is described below.

In step S607, if it is determined that the image advancing number N is less than the threshold (NO in step S607), the processing proceeds to step S609. In step S609, the CPU 102 references the information stored in the RAM 103 to check whether the user-specified group advancing direction is the direction to display the following group or the direction to display the preceding group. In step S609, the CPU 102 can check the flag stored in the RAM 103 in step S605 or S606 to confirm the user-specified group.

If the user-specified group advancing direction is the following group, the processing proceeds to step S610. In step S610, the CPU 102 displays the leading image of the following group on the display unit 105. On the other hand, if the user-specified group advancing direction is the preceding group, the processing proceeds to step S611. In step S611, the CPU 102 displays the leading image of the preceding group on the display unit 105. After the leading image of the following group is displayed in step S610 or the leading image of the preceding group is displayed in step S611, the processing proceeds to step S612.

In step S612, the CPU 102 newly identifies the group, whose leading image is displayed in step S610 or S611, as the group currently selected by the user. When the group currently selected by the user is identified, the information indicating the relevant group is newly stored in the RAM 103. The above-described processing for calculating the number of images in steps S605 and S606 and processing for displaying the leading image in steps S610 and S611 are performed by identifying the currently selected group based on the information stored in the RAM 103.

In step S613, the CPU 102 checks whether the user issues a group selection instruction. If the CPU 102 confirms that the user has issued a group selection instruction (YES in step S613), the processing proceeds to step S614. In step S614, the CPU 102 identifies the group indicated by the information updated in step S612 as the group currently selected by the user and outputs the images included in this group as an output target.

The CPU 102 may adopt various output methods for the output in step S614. For example, the CPU 102 may output the images included in the group selected by the user on the display unit 105 as the display target and perform image advancing thereon. At this time, when the user presses the left/right key 204, image is changed one at a time in the user-selected group. Accordingly, the user can select a group in which a desired image is included, and then select the desired image from the selected group.

For another output method in step S614, a list of all images included in the user-selected group is output and displayed on the display unit 105 to allow the user to select a desired image. Further, the images included in the user-selected group may be output to a printing apparatus to perform index print.

On the other hand, in step S613, if the input of a group selection instruction is not confirmed (NO in step S613), the processing returns to step S602. In step S602, the CPU 102 waits for the user to press the left/right key 204 for instructing image advancing on a group basis.

As described above, when images are displayed according to the processing in the flowchart illustrated in FIG. 6, the user can display the leading image of each group. For example, if a plurality of images is sorted by shooting date, the user can confirm the contents of the leading image of each shooting date.

However, if many images were shot on one shooting date, many images are skipped without the user being aware of these images, and the display target image is changed. In this case, the user sometimes cannot determine which group to select.

In order to address this point, according to the present exemplary embodiment, if the image advancing number N is equal to or greater than the threshold (the number of images, which will be skipped during user-specified group advancing, is equal to or greater than the threshold) in step S607 in FIG. 6, the processing proceeds to step S608. In other words, if it is determined that many files are skipped from display when the display group is changed, the CPU 102 performs the processing in step S608. In step S608, the CPU 102 regards not only one representative image included in the following group or the preceding group, but also images other than the representative image in the group as the display target image during image advancing. The processing in step S608 is described with reference to FIG. 7.

The threshold used in step S607 may be a predefined fixed value or an arbitrary value specified by the user. The threshold may also be determined according to the number of images stored in the memory card 108 or the number of groups into which the images are classified. The threshold may also be determined according to the number of images included in each group. For example, the average value or the intermediate value of the images included in each of a plurality of groups may be used as the threshold used in step S607.

Although an example in which one image is displayed on the display screen is described according to the present exemplary embodiment, two or more images may also be displayed on the display screen. In this case, the threshold used in step S607 may be determined according to the number of images displayed on the display screen.

FIG. 7 is a flowchart illustrating the processing executed in step S608 in FIG. 6. The processing in this flowchart is executed when the image advancing number N is equal to or greater than the threshold in step S607 in FIG. 6.

First, in step S701, the CPU 102 references the information stored in the RAM 103 to check whether the user-specified group advancing direction is the direction to display the images in the following group or the direction to display the images in the preceding group.

In step S701, if the user-specified group advancing direction is the direction to display the images in the following group, the processing proceeds to step S702. In step S702, the CPU 102 identifies an image that follows the currently displayed image in the file list. Then, the processing proceeds to step S703.

In step S703, the CPU 102 determines whether the following image identified in step S702 is the leading image of the following group. For example, if the image in the image file 404 illustrated in FIG. 4A is currently displayed, the CPU 102 determines whether the image in the image file 405 is the leading image of the following group. In step S703, if the image following the currently displayed image is not the leading image of the following group (NO in step S703), the processing proceeds to step S704. In step S704, the CPU 102 displays the following image on the display unit 105.

On the other hand, in step S701, if the user-specified group advancing direction is the direction to display the images in the preceding group, the processing proceeds to step S705. In step S705, the CPU 102 identifies an image that precedes the currently displayed image. In step S706, the CPU 102 determines whether the preceding image is the leading image of the preceding group. In step S706, if the image preceding the currently displayed image is not the leading image of the preceding group (NO in step S706), the processing proceeds to step S707. In step S707, the CPU 102 displays the preceding image on the display unit 105.

After displaying the image in step S704 or 5707, the processing proceeds to step S708. In step S708, the CPU 102 determines whether a user instruction to change and display images one at a time is input. According to the present exemplary embodiment, if the user presses the left/right key 204 when an image displayed on the display unit 105, an image advancing instruction to change images one at a time is issued.

In step S708, if it is determined that an instruction to display the following image is input (FOLLOWING IMAGE in step S708), the processing returns to step S702. On the other hand, in step S708, if it is determined that an instruction to display the preceding image is input (PRECEDING IMAGE in step S705), the processing returns to step S705.

Figure 7B:
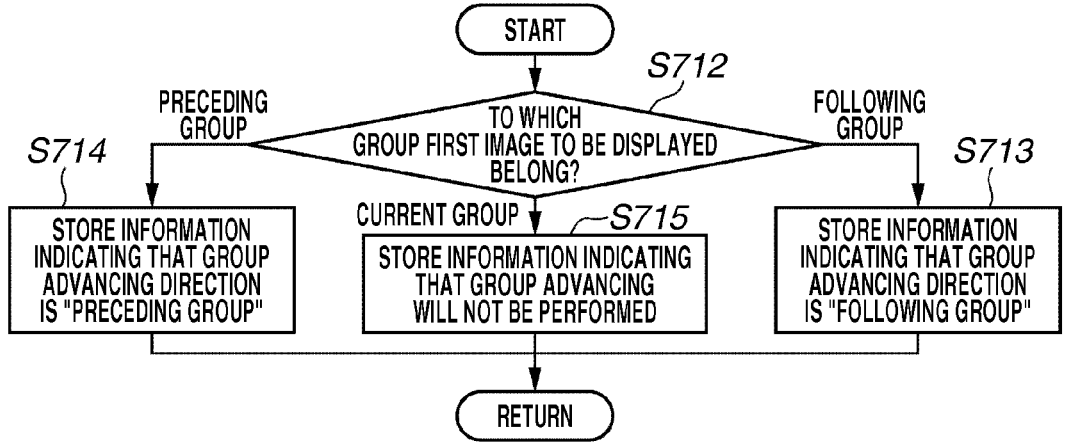

In step S703 or S706, if it is determined that the following image or the preceding image, which is the display target, is the leading image of the group (YES in step S703 or S706), the processing proceeds to the processing of the flowchart illustrated in FIG. 7B. The processing illustrated in FIG. 7B is described below.

In step S708, if it is determined that an image advancing instruction to change images one at a time is not input (NO in step S708), the processing proceeds to step S709. In step S709, the CPU 102 determines whether a user instruction to select an image displayed on the display unit 105 is input. According to the present exemplary embodiment, the CPU 102 determines whether the user presses the OK key 203. In step S709, if a user instruction to select an image is input (YES in step S709), the processing proceeds to step S710.

In step S710, the CPU 102 reads the image selected in step S709 from the memory card 108 according to the file path information included in the file list, and outputs the image. The user can employ an arbitrary method for outputting an image. For example, the user can output the image to a printing apparatus for printing the image, display the image on a display apparatus for displaying the image, or store the image in an internal or external memory of the display control apparatus 101.

In step S709, if it is not confirmed that the user instruction to select an image is input (NO in step S709), the processing proceeds to step S711. In step S711, the CPU 102 determines whether the group advancing instruction is input. In step S711, if the group advancing instruction is input (YES in step S711), the processing proceeds to the processing illustrated in FIG. 7B. On the other hand, if it is not confirmed that the group advancing instruction is input (NO in step S711), the processing returns to step S708.

The flowchart illustrated in FIG. 7B is executed when the leading image of a group becomes the display target image. More specifically, the processing in FIG. 7B is executed when the leading image of a group becomes the display target image according to the instruction input in step S708 and based on the determination processing in step S703 or S706 in FIG. 7A. In addition, based on the determination processing in step S711, if a group advancing instruction is input by the user and the leading image of a group is displayed, the processing also proceeds to the processing illustrated in FIG. 7B.

In step S712 of the flowchart in FIG. 7B, the CPU 102 first determines whether the group, whose leading image is the display target, is the following group, the preceding group, or the currently selected group.

In step S712, if the CPU 102 determines that the leading image of the following group is the display target (FOLLOWING GROUP in step S712), the processing proceeds to step S713. In step S713, the CPU 102 stores the information indicating that the group advancing direction is the following group in the RAM 103. On the other hand, in step S712, if the CPU 102 determines that the leading image of the preceding group is the display target (PRECEDING GROUP in step S712), the processing proceeds to step S714. In step S714, the CPU 102 stores the information indicating that the group advancing direction is the preceding group in the RAM 103.

In addition, in step S712, if the CPU 102 determines that the leading image of the currently selected group is the display target (CURRENT GROUP in step S712), the processing proceeds to step S715. In step S715, the CPU 102 does not perform group advancing and stores the information for displaying the leading image of the currently selected group in the RAM 103. The information pieces stored in steps S713 to 715 may be stored using various methods. For example, three flags corresponding to the following group, the preceding group, and the current group may be set in advance in the RAM 103 to allow these flags to be updated in steps S713 to 715.

According to the processing illustrated in FIG. 7B, the display target group can be determined when the leading image of the group is displayed. After the processing illustrated in FIG. 7B, the processing returns to the flowchart in FIG. 6, and the CPU 102 performs the processing in step S615.

In step S615, the CPU 102 determines whether the display target group, whose leading image is to be displayed, is the currently selected group. In step S615, if the currently selected group is the display target group (YES in step S615), the processing proceeds to step S616. In step S616, the CPU 102 displays the leading image of the currently selected group. Then, the processing returns to step S602, and the CPU 102 waits for the group advancing instruction input by the user.

On the other hand, in step S615, if the CPU 102 determines that the display target group, whose leading image is to be displayed, is not the currently selected group (NO in step S615, that is, the display target group is the following group or the preceding group), the processing proceeds to step S609. As described above, in step S609, the CPU 102 references the information stored in the RAM 103 to confirm the group advancing direction and, in step S610 or S611, displays the leading image of the group in the advancing direction specified by the user.

Even when the user performs image advancing on a group basis, the processing illustrated in FIG. 6 and FIG. 7 enables the display control apparatus 101 to display the images other than the representative image in the group if the number of images to be skipped at the time of changing the display target is equal to or greater than the threshold.

Accordingly, the user can confirm the images in the group, which includes many images, if the user selects to perform group advancing. Therefore, according to the present exemplary embodiment, when a new group is determined as the display target, the display control apparatus 101 can prevent a situation in which many images are skipped without the user being aware of these images and the display target image is changed.

Further, according to the present exemplary embodiment, when the user presses the left/right key 204 to change a group in a group-based image advancing mode, the mode can be automatically changed to a in-group image advancing mode. Therefore, while the images are changed and displayed on a group basis, the user can change the mode to the in-group image advancing mode without worrying about mode switching.

Although the representative image of a group and an image other than the representative image are displayed in the similar format in the above-described display example in FIG. 5, these two types of images may be displayed in different formats. For example, a frame or an icon indicating that the image is a representative image, may be added to the representative image. Alternatively, when an image other than the representative image is displayed, file information may be displayed instead of the image. The file information includes the image information such as the image shooting time, and the file name and the file creation time of the image file.

Accordingly, the user can distinguish the current image advancing mode between the mode in which the display target image is changed on a group basis and the mode in which the display target image is changed in the group, by viewing the display screen on the display unit 105.

As described above, the display control apparatus 101 according to the present exemplary embodiment displays the representative image of the new group when the number of images that are skipped from display when the display target group is changed is less than the threshold. Further, if the number of images that are skipped when the display target group is changed is equal to or greater than the threshold, not only the representative image but also the images, which would otherwise be originally skipped, are displayed. Accordingly, if the number of images to be skipped from display is large when the user changes the display target group, the images that would otherwise be skipped from display by the changing of the display target group can be handled as the display target. Therefore, the present exemplary embodiment can prevent a situation in which the display of many images is skipped without the user being aware of these images.

The description of FIG. 7 indicates an example in which all images, which would otherwise be skipped from display, are handled as the display target. However, the present invention is not limited to this example. More specifically, a predetermined number of images may be skipped, and a part of a plurality of images may be displayed, which would otherwise be skipped from display.

In addition, when images that would otherwise be skipped from display by the changing of the display target group are displayed, the number of images handled as the display target may be changed according to the number of images. For example, if the number of images that would otherwise be skipped from display when group advancing is performed is equal to or greater than a first threshold but is less than a second threshold, images other than the leading image may also be the display target. If the number of images that would otherwise be skipped from display is equal to or greater than the second threshold, more images may be the display target.

Further, according to the exemplary embodiment described above, the leading image of the group, which is determined as the new display target when the display target group is changed, is displayed. Therefore, to calculate the number of images to be skipped from display by group changing, the number of images (N) of the current group is calculated when the group following the current display target group is displayed (image advancing in a forward direction). Similarly, the number of images (N) of the preceding group is calculated when the preceding group is displayed (image advancing in a backward direction).

Instead of this display method, the last image of a group, which is determined as the new display target when the display target group is changed, may be displayed. In this case, to calculate the number of images to be skipped from display by group changing, the number of images (N) of the following group is calculated when the image advancing in the forward direction is performed. Further, when the image advancing is performed in the backward direction, the number of images (N) of the current display group is calculated.

In addition, when the display target group is changed, an image may be displayed, which is in the center in the order of images in a group determined as the new display target. For example, when images are classified into groups according to the shooting date, the image in the center of the images in the order of shooting time of each shooting date may be determined as the representative image. In addition, an image may be determined as the representative image of the group which becomes a new display target according to the characteristics of the image file based on the header information of the image file or an analysis result of the images. When the representative image of each group is determined by various methods described above, the representative image is identified in the file list, and the number of files between the representative images of the two groups is calculated. Thus, the image advancing number N when the display group is changed can be calculated.

In the above description, the display target image is changed according to a user instruction when image advancing is performed in a group. Next, an example is described in which the display target image is changed at a predetermined time interval.

FIG. 8 illustrates an example of display when images are displayed according to the present exemplary embodiment. In FIG. 8, if the user presses the right key 204 when the image in the image file 401 displayed on the display unit 105, the image in the image file 402 is displayed. When a predetermined time has elapsed after displaying the image in the image file 402, the image in the image file 403 is displayed. Then, each time the predetermined time has passed after displaying an image, the images in the group are displayed automatically and sequentially.

If many images are included in a group when the user performs an operation to change and display images on a group basis, the images in the group are displayed automatically and sequentially. Therefore, the user can confirm the contents of the images in the group without performing the operation to advance images in the group.

In addition, when images in a group are displayed automatically and sequentially, the user may input an instruction to select an image. According to this operation, the user can confirm the contents of the images automatically and sequentially displayed on the display unit 105, and select and output a desired image by pressing the OK key 203 when the desired image is displayed.

When the images are automatically advanced in one group as described above, the image information about the image such as the shooting time may also be displayed instead of displaying the images stored in the memory card 108.

In the above description, when the number of images included in one group is equal to or greater than the threshold, the images in the group are identified and then the identified images are displayed to allow the user to select an image. Next, the following describes an example in which information for identifying an image, such as image information, is displayed to allow the user to select the information, and then the image corresponding to the selected information is identified.

Figure 9:
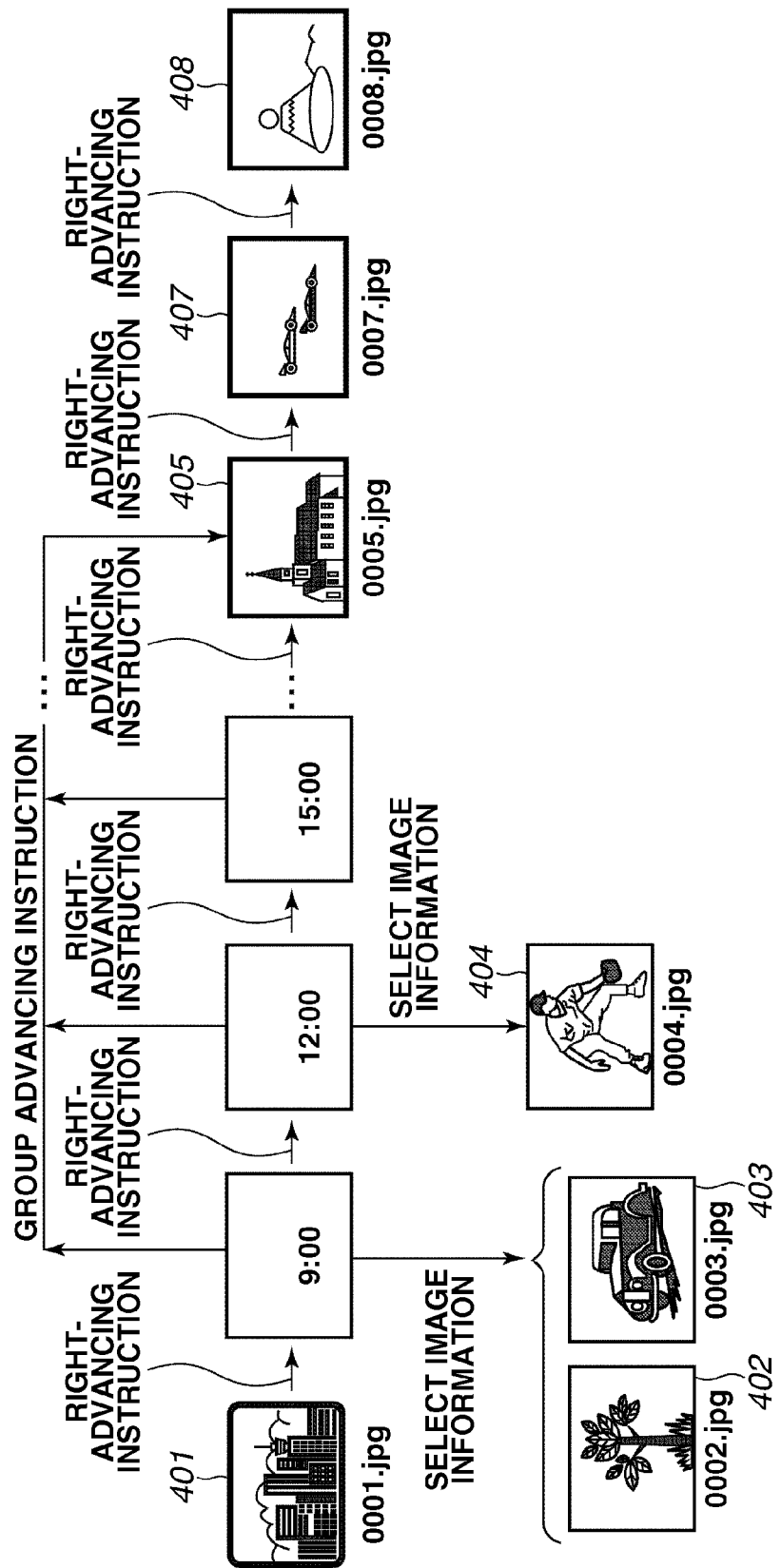
FIG. 9 illustrates an example of display when images are displayed in the exemplary embodiment.

FIG. 9 illustrates an example of display when images are displayed according to the present exemplary embodiment. As shown in FIG. 9, each time the user presses the right key 204, the image information displayed on the display unit 105 is changed. When the image information is displayed, the user presses the OK key 203 to select the image information. Then, the CPU 102 identifies the image corresponding to the image information selected by the user from among the images stored in the memory card 108, and displays the identified image on the display unit 105.

For example, in the example illustrated in FIG. 9, image information indicating a clock time for every three-hour interval is sequentially displayed. When the user selects one piece of the image information, the images that were shot at the time indicated by the selected image information are identified. For example, when the user presses the OK key 203 when the image information indicating "9:00" is displayed, the images that were shot from 9:00 to 11:59 are identified. Similarly, when the user presses the OK key 203 when the image information indicating "12:00" is displayed, the images that were shot from 12:00 to 14:59 are identified.

Therefore, when the user selects the image information "9:00" in the example illustrated in FIG. 9, the images in the image files 402 and 403 are identified. When the user selects the image information "12:00", the image in the image file 404 is identified. When a plurality of images is identified as when the image information of "9:00" is selected, any one of the plurality of images is displayed. In this case, the user presses the left/right key 204 to change the image displayed on the display unit 105. When a plurality of images is identified, the plurality of images may be displayed on the display unit 105 in a list format to allow the user to select one of the images.

As described above, according to the present exemplary embodiment, the information for identifying an image, such as image information, is displayed to allow the user to select the information. Then, the images corresponding to the information selected by the user are identified and displayed. Accordingly, the user can select desired image information and easily narrow down display target images if one group includes many images. For example, if a large number of images were shot on one day, the user can select the image information according to shooting time if the user recognizes the time at which the desired image was shot. Thus, the display target images can be narrowed down, and the user can easily select a desired image without performing image advancing beginning with the leading image in the group.

In the above-described example, the images are classified according to shooting dates and the shooting times are displayed as the image information. In this way, by displaying the information more detailed than the image attribute used to classify the images into groups, the user can easily narrow down the images. However, an attribute which is different from the attribute used to classify the images into groups may also be displayed as the image information. For example, the images may be classified into groups according to shooting dates and, in each group, image shooting locations may be displayed as the image information.

In addition, instead of changing the image information to be displayed on the display unit 105 in response to the user's instruction, the image information about the display target images may automatically be changed at every predetermined time interval.

Further, in the example illustrated in FIG. 9, the groups classified according to shooting dates are further classified into a plurality of sub-groups according to shooting times of the images included in each group when the user inputs a group advancing instruction. When the images included in one group are classified into sub-groups in this way, sub-groups may be set either after the group advancing instruction is input as illustrated in FIG. 9 or when a plurality of images are classified into groups.

More specifically, if a plurality of images is classified into groups and if the number of images included in one group is equal to or greater than the threshold, the group is regarded as a main group and the images included in the main group are further classified into sub-groups. For example, if a plurality of images is classified into groups according to shooting dates and if many images are included in one shooting date, the images may be classified into sub-groups according to the hours and minutes of image shooting times on the shooting date.

When the display target group is changed in response to a user's instruction, a sub-group is regarded as one group, and the representative image of the sub-group is displayed as with a main group.

In this method, the sub-groups are already set when the display target group is changed. Therefore, displaying the representative image of each group can prevent the display of many images from being skipped without performing special processing at group advancing. In addition, when a plurality of representative images included in a plurality of sub-groups is displayed, the user can recognize that the images are classified according to more detailed information than the images in the main group. Therefore, the user can recognize that many images are included in the main group in which the plurality of subgroups is included.

According to the above-described exemplary embodiment, if the number of images to be skipped from display by the changing of the display target group is equal to or greater than the threshold, the representative image as well as the images that would otherwise be skipped can be displayed. Accordingly, if the number of images to be skipped from display is large when the user changes the display target group, the images that would otherwise be skipped from display by the changing of the display target group can be handled as the display target. In this way, the present exemplary embodiment can prevent a situation in which the display of many images is skipped without the user being aware of these images.

Although the display control apparatus 101 includes the display unit 105 as a component in the example according to the exemplary embodiment described above, the display control apparatus 101 may also display images on a display screen of an external display apparatus connected to the display control apparatus 101. Further, the display control apparatus 101 is not limited to the configuration including the operation unit 106 as a component. An external operation device, such as a mouse or a keyboard, may also be used. In this case, the user operates the external operation device, and the display control apparatus 101 receives a user's instruction input from the operation device.

In addition, a touch panel may also be used as an operation device. In this case, an image included in a file is displayed on a display screen of the touch panel, and the user touches the touch panel with a finger or a touch pen to change the display target image.

When the user performs the operation using a touch panel, the user can perform a drag operation, in which the user slides his/her finger or the touch pen on the touch panel while keeping contact with the surface of the touch panel, to change the display image. When the display target image is changed by the drag operation, the number of images corresponding to a distance of the drag operation may be displayed.

The drag operation may be applied to the above-described exemplary embodiment so that group advancing is performed according to the drag operation. In this case, when many images are included in one group, the number of images to be displayed may be increased by the drag operation.

For example, when the user performs the drag operation and if the number of images included in the display target group is less than a predetermined number, only the representative image may be displayed. On the other hand, when the number of images included in the display target group is equal to or greater than the predetermined number, a plurality of images including images other than the representative image may be displayed as the display target even if the drag operation is performed in a similar manner to the above case.

This means that, when the user performs the drag operation at the same distance on a plurality of groups, a larger number of images are displayed for a display target group that includes many images. The drag operation therefore can prevent many images from being unintentionally skipped when the user performs the drag operation to change the display image.

Another method for changing the display target image is a flick operation in which the user slides a finger or a touch pen on the touch panel. When the user performs the flick operation, a plurality of images is automatically moved into the direction indicated by the flick operation to change the display target image. When the user performs the flick operation to move the images, the images may also be moved on a group basis.

More specifically, in response to the flick operation, the images included in each group are automatically moved across the touch panel, and, the images are stayed still when the representative image included in a new display target group is displayed. Accordingly, each flick operation performed by the user causes the representative image of each group to be displayed, thus allowing the user to change the display target group. In this case, because the representative image is displayed in a stationary state, the user can confirm the contents of the representative image.

However, the images other than the representative image included in each group are displayed only while those images are moved in response to the flick operation, and display of those images in a stationary state is skipped. Therefore, when the user performs the flick operation with many images included in one group, the user cannot recognize that many images are moved across the screen, and the display of many images may be unintentionally skipped.

To address this issue, the present exemplary embodiment may be applied when images are moved in response to the flick operation performed by the user. More specifically, when the display target group is changed by the flick operation and if the number of images to be skipped from display is equal to or greater than a predetermined number, the movement of the images is stopped when the images other than the representative image are also displayed. Accordingly, display of many images can be prevented from being skipped when the user performs the flick operation.

In addition, the present exemplary embodiment can be configured to allow the user to select an image on the move across the display screen according to whether the number of images to be skipped from display, when the display target group is changed by the flick operation, is equal to or greater than a predetermined number. In this case, if the number of images to be skipped from display is equal to or greater than the predetermined number, the user can select an image on the move across the display screen. Accordingly, if one group includes many images, the user can select a desired image even during a group advancing operation.

Further, the present exemplary embodiment can be configured to allow the user to select an image on the move across the screen regardless of the number of images to be skipped from display. In this case, a speed at which the images move may be set slower when the number of images to be skipped from display is equal to or greater than a predetermined number than when the number of images to be skipped from display is less than the predetermined number. Accordingly, when one group includes many images, the user can easily select an image on the move across the display screen.

The drag operation and the flick operation described above may be performed not only when the user uses a touch panel but also when the user uses an operation device, such as a mouse.

In the above exemplary embodiment, the example is described in which images are displayed based on an image file. However, the exemplary embodiment is not limited to the image file and may be applied also when the contents of a file, such as a text file, is displayed.

Further, the present exemplary embodiment may be implemented by executing the following processing. More specifically, software (program) for implementing the functions of the exemplary embodiment described above is supplied to a system or an apparatus via a network or various types of storage media to cause a computer (CPU or a microprocessor unit (MPU)) in the system or the apparatus to read and execute the program. The present invention may be executed not only by a single processor but also by a plurality of processors that work together.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-207267 filed Sep. 22, 2011, which is hereby incorporated by reference herein in its entirety.

What is claimed is:

1. A display control apparatus capable of displaying on a display apparatus contents classified into a plurality of groups, the display control apparatus comprising:
   an inputting unit configured to input a changing instruction of a user, in accordance with a predetermined operation, for changing a display target content among the contents;
   a display control unit configured to cause the display apparatus to display a current display target content and a new display target content, so that the current display target content is changed to the new display target content every time the predetermined operation is performed by the user and the changing instruction is input by the inputting unit; and
   at least one processor configured to function as at least one of the inputting unit and the display control unit,
   wherein if a number of contents of a first group including the current display target content and one or more contents is smaller than a predetermined number, and the changing instruction is input by the inputting unit when the current display target content is displayed, the display control unit causes the display apparatus to display a content included in a second group different from the first group as the new display target content by omitting display of all of content(s) which are included in the first group and are different from the current display target content, and if the number of contents of the first group is equal to or greater than the predetermined number, and the changing instruction is input by the inputting unit when the current display target content is displayed, the display control unit causes the display apparatus to display a content included in the first group as the new display target content, wherein the predetermined operation includes a first operation corresponding to a forward direction in a predetermined order of the contents, and a second operation corresponding to a backward direction in the predetermined order, and wherein the display control unit causes the display apparatus to display the new display target content, so that the current display target content is changed to the new display target content in accordance with the predetermined order and a changing direction, corresponding to the predetermined operation performed by the user, of the forward direction or the backward direction.

2. The display control apparatus according to claim 1 wherein, if the number of contents of the first group is smaller than the predetermined number, a leading content, in the second group, in the predetermined order is displayed as the new display target content.

3. The display control apparatus according to claim 2 wherein the contents are classified into the plurality of groups in accordance with the predetermined order, and the leading content in a group following the first group in the predetermined order is displayed as the new display target content.

4. The display control apparatus according to claim 2, wherein the contents are classified into the plurality of groups in accordance with the predetermined order, and the leading content in a group preceding the first group in the predetermined order is displayed as the new display target content.

5. The display control apparatus according to claim 1, further comprising:
a selection unit configured to select an output target content of the current display target content or the new display target content displayed by the display control unit, in accordance with input of a selection instruction different from the changing instruction; and
an output unit configured to output the output target content selected by the selection unit.

6. The display control apparatus according to claim 5,
further comprising a specification unit configured to specify a group, including the output target content selected by the selection unit, from the plurality of groups,
wherein the output unit outputs contents included in the group specified by the specification unit.

7. The display control apparatus according to claim 5, wherein the output unit causes a print device to print an image corresponding to the output target content selected by the selection unit.

8. The display control apparatus according to claim 1 wherein, if the number of contents of the first group is equal to or greater than the predetermined number, the display control unit displays file information, which indicates an attribute of a file including the content included in the first group, and causes the display apparatus to display the content of the file corresponding to file information selected by a user instruction on the display apparatus.

9. The display control apparatus according to claim 1 wherein, if the number of contents of the first group is equal to or greater than the predetermined number and the changing instruction is input by the inputting unit, the display control unit causes the display apparatus to display the new display target content included in the first group, and then, if the changing instruction is further input by the inputting unit, the display control unit causes the display apparatus to display another content included in the second group by changing the new display target content to the another content.

10. The display control apparatus according to claim 1 wherein, if the number of contents of the first group is equal to or greater than the predetermined number and the changing instruction is input by the inputting unit, the display control unit causes the display apparatus to display the new display target content included in the first group and another content included in the second group by changing the new display target content to the another content at a predetermined time interval, without further input of the changing instruction.

11. The display control apparatus according to claim 1, further comprising a classification unit configured to classify the contents into the plurality of groups based on attributes of the contents.

12. The display control apparatus according to claim 1, wherein the contents are included in a plurality of files.

13. The display control apparatus according to claim 12, wherein the contents are included in a plurality of image files, and the contents are classified into the plurality of groups each of which corresponds to a shooting date.

14. A method of display control for causing a display apparatus to display contents of a plurality of files classified into a plurality of groups, the method comprising:
inputting a changing instruction of a user, in accordance with a predetermined operation for changing a display target content among the contents; and
causing the display apparatus to display a current display target content and a new display target content, so that the current display target content is changed to the new display target content every time the predetermined operation is performed by the user and the changing instruction is input by said inputting,
wherein, if a number of contents of a first group including the current display target content and one or more contents is smaller than a predetermined number, and the changing instruction is input by said inputting when the current display target content is displayed, the display apparatus is caused to display a content included in a second group different from the first group as the new display target content by omitting display of all of content(s) which are included in the first group and are different from the current display target content, and if the number of contents of the first group is equal to or greater than the predetermined number, and the changing instruction is input by said inputting when the current display target content is displayed, the display apparatus is caused to display a content included in the first group as the new display target content,
wherein the predetermined operation includes a first operation corresponding to a forward direction in a predetermined order of the contents, and a second operation corresponding to a backward direction in the predetermined order, and
wherein the display apparatus is caused to display the new display target content, so that the current display target content is changed to the new display target content in accordance with the predetermined order and a changing direction, corresponding to the predetermined operation performed by the user, of the forward direction or the backward direction.

15. A non-transitory computer readable storage medium storing therein a program that when executed by a computer causes the computer to perform a method of display control for causing a display apparatus to display contents of a plurality of files classified into a plurality of groups, the method comprising:

inputting a changing instruction of a user, in accordance with a predetermined operation for changing a display target content among the contents; and causing the display apparatus to display a current display target content and a new display target content, so that the current display target content is changed to the new display target content every time the predetermined operation is performed by the user and the changing instruction is input by said inputting, wherein, if a number of contents of a first group including the current display target content and one or more contents is smaller than a predetermined number, and the changing instruction is input by said inputting when the current display target content is displayed, the display apparatus is caused to display a content included in a second group different from the first group as the new display target content by omitting display of all of content(s) which are included in the first group and are different from the current display target content, and if the number of contents of the first group is equal to or greater than the predetermined number, and the changing instruction is input by said inputting when the current display target content is displayed, the display apparatus is caused to display a content included in the first group as the new display target content, wherein the predetermined operation includes a first operation corresponding to a forward direction in a predetermined order of the contents, and a second operation corresponding to a backward direction in the predetermined order, and wherein the display apparatus is caused to display the new display target content, so that the current display target content is changed to the new display target content in accordance with the predetermined order and a changing direction, corresponding to the predetermined operation performed by the user, of the forward direction or the backward direction.

* * * * *